(12) United States Patent
Wang et al.

(10) Patent No.: US 12,313,287 B2
(45) Date of Patent: May 27, 2025

(54) AIR CONDITIONER PIPELINE DEVICE AND AIR CONDITIONER

(71) Applicant: Gree Electric Appliances, Inc. of Zhuhai, Guangdong (CN)

(72) Inventors: Jing Wang, Guangdong (CN); Meng Huang, Guangdong (CN); Shangxian Feng, Guangdong (CN); Ningning Chen, Guangdong (CN); Zunhui Xiao, Guangdong (CN); Xianqiao Yu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 102 days.

(21) Appl. No.: 18/273,303

(22) PCT Filed: Oct. 15, 2021

(86) PCT No.: PCT/CN2021/123986
§ 371 (c)(1),
(2) Date: Jul. 20, 2023

(87) PCT Pub. No.: WO2022/166249
PCT Pub. Date: Aug. 11, 2022

(65) Prior Publication Data
US 2023/0408115 A1    Dec. 21, 2023

(30) Foreign Application Priority Data
Feb. 3, 2021    (CN) .......................... 202110149340.0

(51) Int. Cl.
*F24F 3/06*    (2006.01)
(52) U.S. Cl.
CPC ..................................... *F24F 3/06* (2013.01)

(58) Field of Classification Search
CPC .................... F24F 3/06; F24F 1/32; F24F 1/34
See application file for complete search history.

(56) References Cited

U.S. PATENT DOCUMENTS 7,921,665 B2 *    4/2011    Higuma ................... F24F 11/30
62/298
2005/0120732 A1    6/2005    Matsuoka
(Continued)

FOREIGN PATENT DOCUMENTS

| CN | 1636123 A | 7/2005 |
|----|-----------|--------|
| CN | 1930422 A | 3/2007 |

(Continued)

OTHER PUBLICATIONS

CN 202110149340.0, First Examination Opinion Notification, Jan. 16, 2025.

*Primary Examiner* — Lionel Nouketcha
(74) *Attorney, Agent, or Firm* — The Webb Law Firm

(57) ABSTRACT

The present disclosure relates to an air conditioner pipeline device and an air conditioner. The air conditioner pipeline device includes a gaseous refrigerant connecting pipe and a liquid refrigerant connecting pipe which are configured to be connected between an indoor unit and an outdoor unit of the air conditioner. At least one of the gaseous refrigerant connecting pipe and the liquid refrigerant connecting pipe adopts a multi-layer pipe. The multi-layer pipe includes at least two conductive pipes, sequentially and coaxially sleeved along a radial direction of the multi-layer pipe and configured to be connected to a power supply of the air conditioner to transmit power to the air conditioner, where an internal area of the innermost layer of conductive pipe is used for a refrigerant to flow; and first insulating layers, configured to achieve insulation of at least two conductive pipes.

9 Claims, 2 Drawing Sheets

(56) References Cited

U.S. PATENT DOCUMENTS

| | | |
|---|---|---|
| 2008/0032621 A1 | 2/2008 | Higuma et al. |
| 2011/0219795 A1 | 9/2011 | Ahn et al. |
| 2016/0273796 A1* | 9/2016 | Lee .......................... F24F 11/89 |

FOREIGN PATENT DOCUMENTS

| | | | |
|---|---|---|---|
| CN | 102195172 A | | 9/2011 |
| CN | 104170028 A | | 11/2014 |
| CN | 106440052 A | | 2/2017 |
| CN | 110017429 A | | 7/2019 |
| CN | 112747388 A | | 5/2021 |
| CN | 214307368 A | | 9/2021 |
| CN | 214307368 U | | 9/2021 |
| JP | S62210342 A | | 9/1987 |
| JP | 2005164219 A | | 6/2005 |
| JP | 2007292359 A | * | 11/2007 |
| JP | 2008101911 A | | 5/2008 |
| JP | 2018129888 A | | 8/2018 |
| KR | 1020110019235 A | | 2/2011 |
| KR | 101279074 B1 | | 6/2013 |

\* cited by examiner

AIR CONDITIONER PIPELINE DEVICE AND AIR CONDITIONER

CROSS-REFERENCE TO RELATED APPLICATIONS

This application is the United States national phase of International Application No. PCT/CN2021/123986 filed Oct. 15, 2021, and claims priority to Chinese Patent Application No. 202110149340.0, filed Feb. 3, 2021, the disclosures of which are hereby incorporated by reference in their entireties.

BACKGROUND OF THE INVENTION

Field of the Invention

The present disclosure relates to the technical field of refrigeration equipment, and in particular to an air conditioner pipeline device and an air conditioner.

Description of Related Art

With the improvement of people's living standards, air conditioners are essential electrical appliances in home life. At present, an indoor unit and an outdoor unit of an air conditioner product adopt a split structure, refrigerant is transmitted by a copper pipe, and a lead is used for power supply and communication.

For the after-sales installation of the air conditioner, pipe connection and wiring belong to different types of work, so that the complexity of the used tools and skills is increased; and the power supply wiring of the indoor unit and the outdoor unit is exposed outside for a long time, resulting in the risk of rat and insect biting. A copper pipe and a cable are wound together, a protective layer such as sponge is added to the outer layer and has a large diameter, engineering installation is extremely inconvenient, and the used cable will cause great waste.

SUMMARY OF THE INVENTION

According to a first aspect of the present disclosure, an air conditioner pipeline device is provided and includes: a gaseous refrigerant connecting pipe and a liquid refrigerant connecting pipe which are configured to be connected between an indoor unit and an outdoor unit of the air conditioner. At least one of the gaseous refrigerant connecting pipe and the liquid refrigerant connecting pipe adopts a multi-layer pipe. The multi-layer pipe includes:
  at least two conductive pipes, sequentially and coaxially sleeved along a radial direction of the multi-layer pipe and configured to be connected to a power supply of the air conditioner to transmit power to the air conditioner, where an internal area of the innermost layer of conductive pipe is used for a refrigerant to flow; and
  first insulating layers, configured to achieve insulation of at least two conductive pipes.

In some embodiments, at least two conductive pipes include:
  a first conductive pipe, the internal area of the first conductive pipe is used for a refrigerant to flow; and
  at least one second conductive pipe, sleeved outside the first conductive pipe;
  wherein the insulating layers are arranged between the first conductive pipe and the second conductive pipe, between the adjacent second conductive pipes, and on an outer surface of the outermost layer of second conductive pipe, and the first conductive pipe and at least one second conductive pipe are connected to the power supply.

In some embodiments, the multi-layer pipe further includes: a protective pipe, coaxially sleeved outside at least two conductive pipes.

In some embodiments, a diameter of the gaseous refrigerant connecting pipe is greater than a diameter of the liquid refrigerant connecting pipe, and the gaseous refrigerant connecting pipe adopts a multi-layer pipe.

In some embodiments, a voltage class connected to the outer layer of conductive pipe is less than a voltage class connected to the inner layer of conductive pipe.

In some embodiments, the air conditioner pipeline device further includes an adapter, a first refrigerant pipe arranged in the indoor unit, and a second refrigerant pipe arranged in the outdoor unit, where two ends of the multi-layer pipe respectively communicate with the first refrigerant pipe and the second refrigerant pipe through the adapter;
  wherein the adapter includes a main body part, an electrical connection structure and a connection terminal; the electrical connection structure is arranged in the main body part; the electrical connection structure has the same layer structure as the multi-layer pipe and is butted with the multi-layer pipe; and the connection terminal is led out of the electrical connection structure and is connected to the power supply.

In some embodiments, the power supply is a low-voltage power supply.

In some embodiments, the voltage range of the low-voltage power supply is (0V, 50V].

In some embodiments, the power supply is a direct-current power supply. The direct-current power supply has a first electrode and a second electrode. At least two conductive pipes include:
  a first conductive pipe, where an internal area of the first conductive pipe is used for a refrigerant to flow, and the first conductive pipe is connected to one of the first electrode and the second electrode; and
  a second conductive pipe, sleeved outside the conductive pipe, where the second conductive pipe is connected to the other one of the first electrode and the second electrode.

According to a second aspect of the present disclosure, an air conditioner is provided and includes the air conditioner pipeline device according to the above embodiment.

BRIEF DESCRIPTION OF THE DRAWINGS

The accompanying drawings described herein are used to provide further understanding of the present disclosure and constitute a part of the present application. The schematic embodiments of the present disclosure and the description thereof are used to explain the present disclosure, but do not constitute an inappropriate limitation to the present disclosure. In the drawings.

Figure 1:
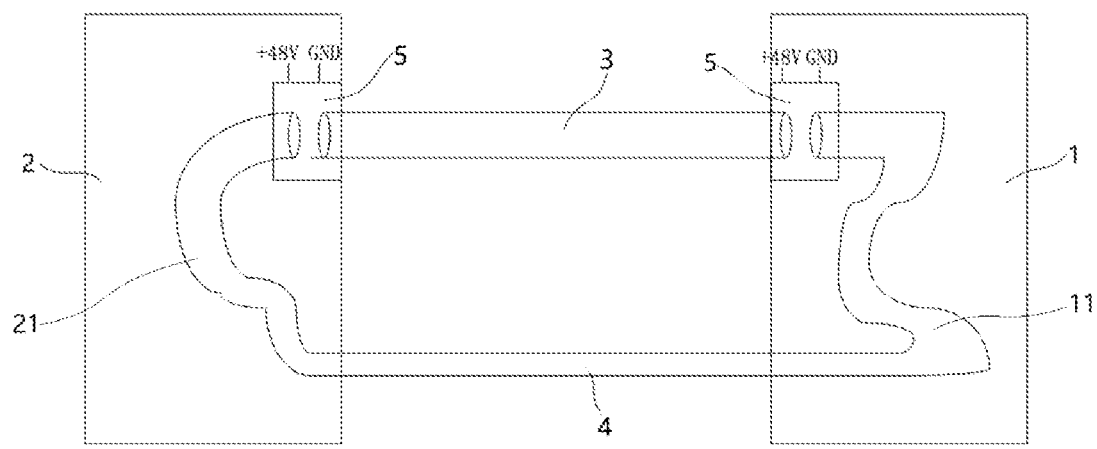
FIG. 1 is a schematic diagram according to some embodiments of the present disclosure.

DESCRIPTION OF REFERENCE NUMERALS 1, indoor unit; 2, outdoor unit; 3, gaseous refrigerant connecting pipe; 4, liquid refrigerant connecting pipe; 5, adapter;
11, first refrigerant pipe;
21, second refrigerant pipe;
31, first conductive pipe; 311, internal area; 32, first insulating layer; 33, second conductive pipe; 34, protective pipe;
50, main body part; 5', electrical connection structure; 51, first conductive ring; 52, second insulating layer; 53, second conductive ring; 54, protective ring; 55, connection terminal.

DESCRIPTION OF THE INVENTION

The present disclosure is described hereinafter in detail. In the following paragraphs, different aspects of the embodiments are defined in detail. The aspects defined may be combined with one or more of any other aspects unless it is explicitly pointed that they cannot be combined. In particular, any features considered to be preferred or favorable may be combined with one or more of other features considered to be preferred or favorable combination.

The terms "first", "second" and the like appearing in the present disclosure are only configured to facilitate description so as to distinguish different components with the same name, but not to represent a sequence or a primary and secondary relationship.

In addition, when an element is called "on" another element, the element may be directly on another element, or may be indirectly on another element, and one or more intermediate elements may be inserted between the element and another element. In addition, when the element is called "connected to" another element, the element may be directly connected to another element, or may be indirectly connected to another element, and one or more intermediate elements may be inserted between the element and another element. Hereinafter, the same reference numerals represent the same element.

In the description of the present disclosure, an azimuth or position relationship indicated by terms "upper", "lower", "top", "bottom", "front", "rear", "inner", "outer" and the like is an azimuth or position relationship based on the accompanying drawings, which is only for convenient description of the present disclosure, but not indicates or implies that the referred device must have a specific azimuth and perform construction and operation in the specific azimuth; therefore, it cannot be interpreted as a limitation to the protection scope of the present disclosure.

Embodiments of the present disclosure provide an air conditioner pipeline device and an air conditioner, which can reduce the installation difficulty of the air conditioner.

In the air conditioner pipeline device provided by the embodiments of the present disclosure, at least one of the gaseous refrigerant connecting pipe and the liquid refrigerant connecting pipe adopts a multi-layer pipe. The multi-layer pipe includes at least two conductive pipes that are coaxially sleeved. An internal area of the innermost layer of conductive pipe is used for a refrigerant to flow, and the conductive pipe is connected to a power supply of the air conditioner so as to transmit power to the air conditioner. Therefore, multiplexing of refrigerant transmission and power transmission is realized by the same pipe, so that the connection structure of the indoor unit and the outdoor unit can be simplified, the cost can be saved, the installation complexity of the air conditioner pipeline can be reduced, and the installation safety of the air conditioner pipeline can be improved.

Figure 2:
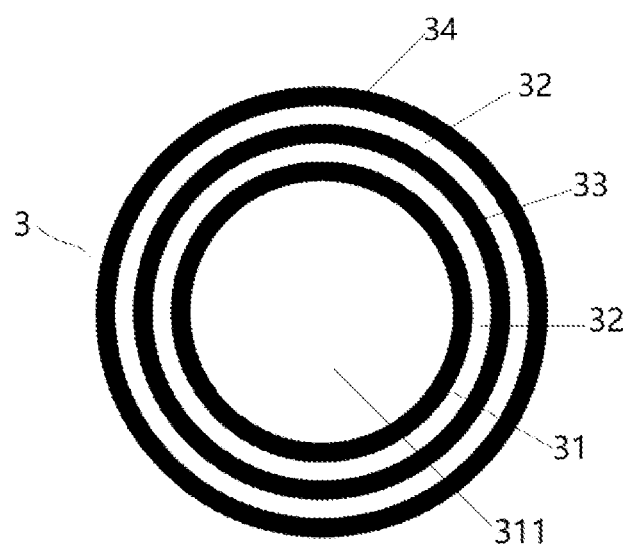
FIG. 2 is a cross-section view of some embodiments of a multi-layer pipe in an air conditioner pipeline device according to the present disclosure.
Figure 3:
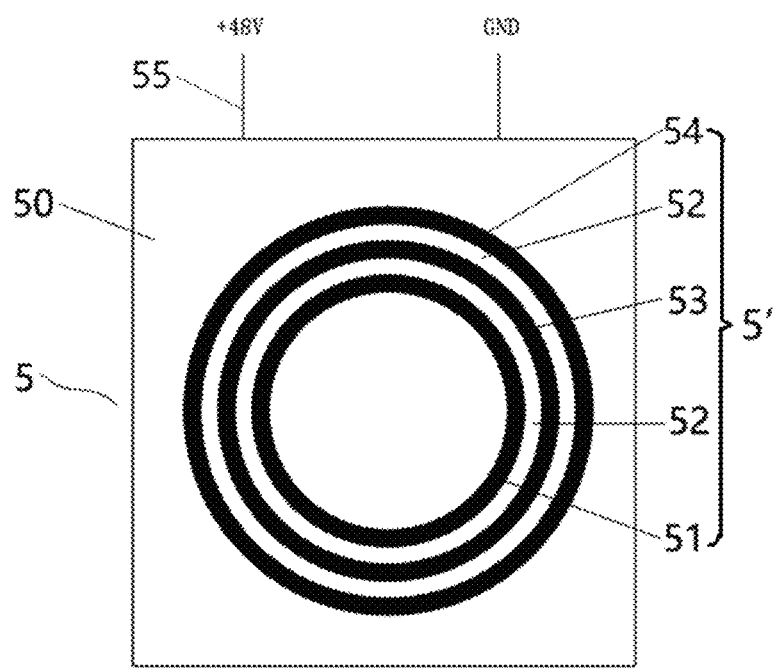
FIG. 3 is a cross-section view of some embodiments of an adapter in an air conditioner pipeline device according to the present disclosure.

As shown in FIG. 1 to FIG. 3, the present disclosure provides an air conditioner pipeline device. In some embodiments, the air conditioner pipeline device includes: a gaseous refrigerant connecting pipe 3 and a liquid refrigerant connecting pipe 4 which are connected between an indoor unit 1 and an outdoor unit 2 of an air conditioner. Specifically, a first refrigerant pipe 11 is arranged in the indoor unit 1, a second refrigerant pipe 21 is arranged in the outdoor unit 2, two ends of the gaseous refrigerant connecting pipe 3 respectively communicate with a first end of the first refrigerant pipe 11 and a first end of the second refrigerant pipe 21, and two ends of the liquid refrigerant connecting pipe 4 respectively communicate with a second end of the first refrigerant pipe 11 and a second end of the second refrigerant pipe 21. Therefore, the first refrigerant pipe 11, the gaseous refrigerant connecting pipe 3, the second refrigerant pipe 21 and the liquid refrigerant connecting pipe 4 communicate with each other sequentially to form a closed refrigerant circulation path.

At least one of gaseous refrigerant connecting pipe 3 and the liquid refrigerant connecting pipe 4 adopts a multi-layer pipe. The multi-layer pipe includes at least two conductive pipes and a first insulating layer 32, where the at least two conductive pipes are sequentially and coaxially sleeved along a radial direction of the multi-layer pipe; each of the conductive pipes is connected to the power supply of the air conditioner to transmit power to the air conditioner; and an internal area 311 of the innermost layer of conductive pipe is used for a refrigerant to flow. The first insulating layer 32 is configured to achieve insulation between the at least two conductive pipes. The first insulating layer 32 may be arranged between the adjacent conductive pipes, or may be arranged on an outer surface of the outermost layer of conductive pipe. The first insulating layer 32 may form a tubular structure.

The conductive pipes may be made of conductive materials, for example, metal materials, such as copper, iron, aluminum, magnesium or other alloy. The multi-layer pipe may adopt an integrated extrusion forming process.

This embodiment, and "axial", "circumferential" and "radial" mentioned hereafter are all defined on the basis of the multi-layer pipe.

In the air conditioner pipeline device according to the embodiments, at least one of the gaseous refrigerant connecting pipe and the liquid refrigerant connecting pipe adopts a multi-layer pipe, multiplexing of refrigerant transmission and power transmission is realized by the same pipe, the innermost layer of conductive pipe is used for the refrigerant to flow, and each layer of conductive pipe may serve as a conductor to be connected to the power supply. Therefore, a cable required to be arranged between the split indoor unit 1 and outdoor unit 2 can be omitted, thereby simplifying the connection structure of the indoor unit and the outdoor unit, saving the cost, reducing the installation complexity of the air conditioner pipeline, and improving the installation safety of the air conditioner pipeline. Furthermore, it is easy to ensure the insulation performance between layers by a layered power supply method. Each conductive copper pipe is located inside, which is safer and more reliable under the low protection class.

In some embodiments, as shown in FIG. 2, at least two conductive pipes include: a first conductive pipe 31 and at least one second conductive pipe 33. An internal area 311 of the first conductive pipe 31 is used for a refrigerant to flow;

and at least one second conductive pipe 33 is sleeved outside the first conductive pipe 31. First insulating layers 32 are arranged between the first conductive pipe 31 and the adjacent second conductive pipe 33, between the adjacent second conductive pipes 33, and on an outer surface of the outermost layer of second conductive pipe 33; and the first conductive pipe 31 and the at least one second conductive pipe 33 are connected to the power supply.

Specifically, the number of the second conductive pipes 33 is determined according to the power supply. For example:

for a direct-current power supply, that is, an indoor unit 1 and an outdoor unit 2 are powered through direct current, one second conductive pipe 33 is provided, and the first conductive pipe 31 and the second conductive pipe 33 are respectively connected to a first electrode and a second electrode of the direct-current power supply.

For a household air conditioner using an alternating-current power supply, only a live wire and a neutral wire are provided, one second conductive pipe 33 is provided, and the first conductive pipe 31 and the second conductive pipe 33 are respectively connected to the live wire and the neutral wire.

For a commercial air conditioner using an alternating-current power supply, more than three power connection wires are provided, at least two second conductive pipes 33 may be provided, and the first conductive pipe 31 and the at least two second conductive pipes 33 are respectively connected to the power connection wires.

In this embodiment, conductivity can be achieved through the first conductive pipe 31 and the second conductive pipe 33 that are coaxially sleeved, thereby supplying power for the air conditioner; furthermore, the insulating layers 32 are arranged between the first conductive pipe 31 and the second conductive pipe 33, and between the adjacent second conductive pipes 33, so that the requirement of high insulation performance when a refrigerant connecting pipe is connected to compressors, evaporators and shells of the indoor unit and the outdoor unit can be met. In addition, when an insulating refrigerant is used, a resistor of a conductor is determined by a material, a length and cross-section area, and the refrigerant is not conductive and will not affect the conductivity of the first conductive pipe 31; and when a non-insulating refrigerant is used, it is necessary to arrange an insulating layer on an inner wall of the first conductive pipe 31, so higher safety is achieved when the refrigerant connecting pipe of the air conditioner is used for conduction.

As shown in FIG. 2, the multi-layer pipe further includes: a protective pipe 34, coaxially sleeved outside at least two conductive pipes. Specifically, the protective pipe 34 is arranged on an outer layer of the outermost layer of second conductive pipe 33.

The protective pipe 34 may be made of a conductive material. In this case, a first insulating layer 32 is arranged between the second conductive pipe 33 and the protective pipe 34. Or the protective pipe 34 may be made of an insulating material. In this case, a first insulating layer 32 may be omitted between the second conductive pipe 33 and the protective pipe 34.

In this embodiment, the protective pipe 34 is provided to protect the conductive pipe inside for power supply, thereby preventing the conductive pipe from being exposed to the external environment, avoiding the risk of electric energy leakage or short circuit in case of rain, reducing the protection class requirement, and prolonging the service life of the refrigerant connecting pipe.

As shown in FIG. 1, a diameter of the gaseous refrigerant connecting pipe 3 is greater than a diameter of the liquid refrigerant connecting pipe 4, and the gaseous refrigerant connecting pipe 3 adopts a multi-layer pipe. Since the gaseous refrigerant connecting pipe 3 is thicker and has higher current-carrying capacity, the heat exchange capacity of the air conditioner and the power supply safety of the air conditioner can be improved. Optionally, the liquid refrigerant connecting pipe 4 may adopt a multi-layer pipe, or both the gaseous refrigerant connecting pipe 3 and the liquid refrigerant connecting pipe 4 adopt multi-layer pipes.

In some embodiments, a voltage class connected to the outer layer of conductive pipe is less than a voltage class connected to the inner layer of conductive pipe. A diameter of the outer layer of conductive pipe is greater than that of the inner layer of conductive pipe, so higher current-passing capacity is achieved, the voltage class is inversely proportional to the passed current under the same power, and the outer layer of conductive pipe can be connected to a smaller voltage class.

In some embodiments, as shown in FIG. 1, the air conditioner pipeline device further includes an adapter 5, a first refrigerator pipe 11 is arranged in the indoor unit 1, a second refrigerant pipe 21 is arranged in the outdoor unit 2, and two ends of the multi-layer pipe respectively communicate with the first refrigerant pipe 11 and the second refrigerant pipe 21 through the adapter 5. The multi-layer pipe and the adapter 5 may be fixed through a nut.

As shown in FIG. 3, the adapter 5 includes a main body part 50, an electrical connection structure 5' and a connection terminal 55, where the electrical connection structure 5' is arranged in the main body part 50, the electrical connection structure 5' has the same layer structure as the multi-layer pipe and is butted with the multi-layer pipe, and the connection terminal 55 is led out from the electrical connection structure 5' and is connected to the power supply. At least two connection terminals 55 may be provided. The at least two connection terminals 55 are connected to at least two conductive pipes in a one-to-one correspondence manner, that is, at least two conductive pipes are connected to the power supply through the electrical connection structure 5' in the adapter 5.

Specifically, as shown in FIG. 3, the electrical connection structure 5' includes a first conductive ring 51, at least one second conductive ring 53 coaxially sleeved outside the first conductive ring 51, and a protective ring 54 coaxially sleeved outside the outermost layer of second conductive ring 53, wherein the second insulating layers 52 are arranged between the first conductive ring 51 and the second conductive ring 53, between the adjacent second conductive rings 53, and between the second conductive ring 53 and the protective ring 54. When the multi-layer pipe is butted with the adapter 5, the first conductive pipe 31 is butted with the first conductive ring 51, the second conductive ring 53 is butted with the second conductive pipe 33, and the protective pipe 34 is butted with the protective ring 54.

In this embodiment, the adapter 5 is provided, so that the two ends of the multi-layer pipe can respectively communicate with the first refrigerant pipe 11 and the second refrigerant pipe 21, the refrigerant connecting pipe is connected to the indoor unit and the outdoor unit, the refrigerant can flow in the whole air conditioner pipeline, and the indoor unit 1 can be electrically connected to the outdoor unit 2; and through the adapter 5, electric energy provided by the power supply is provided to the indoor unit 1 and the outdoor unit 2 through the conductive pipe in the multi-layer pipe.

In the above embodiments, the power supply is a low-voltage power supply.

At present, the electricity of the air conditioner adopts 220V or 380V alternating current, and the voltage is higher, which is far beyond the safe voltage range that the human body can bear, so safety accidents, such as electric shock, often occur. Electric leakage and burning often occur at the interface due to poor contact, uneven quality and aging, which brings a certain risk to the safety of home life. In some related arts, a high-power air conditioner cabinet has a special coupler to replace a wall socket in the home, thereby ensuring contact stability, safety and reliability. However, the method for preventing electric leakage and damage cannot solve the problems completely, which cannot fully cover the air conditioner cabinet and the wall-mounted air conditioner required by users.

Since the problem of electric energy leakage under the low protection class is easy to occur after the refrigerant connecting pipe is used for power supply, this embodiment can reduce the potential safety hazard of electric shock caused by the high working voltage of the conventional alternating-current air conditioner by using the low-voltage power supply with a voltage less than the human body safe voltage, and can solve the problem of electric shock caused by strong electricity and the potential electrical safety hazard caused by unit aging, thereby fundamentally solving the problem of hurting people by electric shock.

For example, the voltage range of the low-voltage power supply is (0V, 50V], and the voltage range is less than the human body safe voltage. Preferably, the low-voltage power supply is 48V. The low-voltage power supply may be powered by direct current or alternating current.

According to this embodiment, power supply can be performed by the low-voltage power supply on the basis of realizing the power supply of the air conditioner through the refrigerant connecting pipe, so that the safety of power supply can be further improved. Since the refrigerant connecting pipe is exposed outside, especially at a position where the refrigerant connecting pipe is connected to the indoor unit 1 and the outdoor unit 2, using the low-voltage power supply for power supply can reduce the safety in case of electric shock and can reduce the requirement on the protection class.

In some embodiments, the power supply is a direct-current power supply. The direct-current power supply has a first electrode and a second electrode. For example, the first electrode is a positive electrode and the second electrode is a negative electrode, or the first electrode is a negative electrode and the second electrode is a positive electrode. At least two conductive pipes include: a first conductive pipe 31, where an internal area 311 of the first conductive pipe is used for the refrigerant to flow, and the first conductive pipe 31 is connected to one of the first electrode and the second electrode; and a second conductive pipe 33, sleeved outside the first conductive pipe 31, where the second conductive pipe 33 is connected to the other one of the first electrode and the second electrode.

When a direct-current power supply is used, only one second conductive pipe 33 is required, so that the structure of the multi-layer pipe can be simplified and processing is facilitated; furthermore, when low-voltage direct-current power supply is used, the air conditioner is direct-current power supply equipment and has higher safety during use.

Optionally, an alternating-current power supply may be used and has the advantages: it is unnecessary to change the power supply mode of the original air conditioner and power supply can be realized conveniently through the refrigerant connecting pipe.

In some specific embodiments, as shown in FIG. 2 and FIG. 3, the gaseous refrigerant connecting pipe 3 adopts a multi-layer pipe. The multi-layer pipe includes a first conductive pipe 31, a second conductive pipe 33 and a protective pipe 34 from inside to outside in a radial direction, where first insulating layers 32 are arranged between the first conductive pipe 31 and the second conductive pipe 33 and between the second conductive pipe 33 and the protective pipe 34. An internal area 311 of the first conductive pipe 31 is used for a refrigerant to flow, the first conductive pipe 31 is connected to a 48V voltage, and the second conductive pipe 33 is grounded.

Correspondingly, as shown in FIG. 3, the adapter 5 includes a main body part 50, an electrical connection structure 5' and two connection terminals 55, where the electrical connection structure 5' includes a first conductive ring 51, a second conductive ring 53 and a protective ring 54 from inside to outside in the radial direction; and second insulating layers 52 are arranged between the first conductive ring 51 and the second conductive ring 53 and between the second conductive ring 53 and the protective ring 54. When the multi-layer pipe is butted with the adapter 5, the first conductive pipe 31 is butted with the first conductive ring 51, the second conductive ring 53 is butted with the second conductive pipe 33, and the protective pipe 34 is butted with the protective ring 54. The connection terminal 55 connected to the 48V voltage is led out of the first conductive ring 51, and the grounded connection terminal 55 is led out of the second conductive ring 53.

Secondly, the present disclosure further provides an air conditioner. In some embodiments, the air conditioner includes the air conditioner pipeline device according to the above embodiment.

In the engineering installation process of the air conditioner, one air conditioner pipeline can be used to realize refrigerant transmission and power supply. It is unnecessary to bind pipelines and cables together for engineering installation, so that the construction complexity is greatly simplified, and the engineering cost is saved.

Furthermore, the conductive pipe of the air conditioner pipeline is made of a metal conductive material and can directly serve as an electric lead, so that a large number of engineering cable costs are saved, the engineering construction is simplified, and the construction cost is reduced.

The air conditioner pipeline and the air conditioner according to the present disclosure are described in detail above. The principle and embodiments of the present disclosure are elaborated by specific embodiments, and the description of the above embodiments is only intended to help understand the method of the present disclosure and the core concept thereof. It should be pointed out that for those of ordinary skill in the technical field, several improvements and modifications may be made to the present disclosure without departing from the principle of the present disclosure, and these improvements and modifications should fall within the protection scope of the claims of the present disclosure.

The invention claimed is:
1. An air conditioner pipeline device, comprising:
a gaseous refrigerant connecting pipe, configured to be connected between an indoor unit and an outdoor unit of an air conditioner;

a liquid refrigerant connecting pipe configured to be connected between the indoor unit and the outdoor unit of the air conditioner;

an adapter comprising a main body part, an electrical connection structure and a connection terminal, the electrical connection structure is arranged in the main body part, the connection terminal is led out from the electrical connection structure and is connected to a power supply of the air conditioner;

a first refrigerant pipe arranged in the indoor unit; and a second refrigerant pipe arranged in the outdoor unit;

wherein at least one of the gaseous refrigerant connecting pipe and the liquid refrigerant connecting pipe adopts a multi-layer pipe, two ends of the multi-layer pipe respectively communicate with the first refrigerant pipe and the second refrigerant pipe through the adapter, the electrical connection structure has the same layer structure as the multi-layer pipe and is butted with the multi-layer pipe; and the multi-layer pipe comprises:

at least two conductive pipes, sequentially and coaxially sleeved along a radial direction of the multi-layer pipe, and configured to be connected to a power supply of the air conditioner to transmit power to the air conditioner, an internal area of the innermost layer of conductive pipe being configured to allow a refrigerant to flow, and a first insulating layers, arranged between the adjacent conductive pipes of the at least two conductive pipes, and/or arranged on an outer surface of the outermost layer of the at least two conductive pipes.

2. The air conditioner pipeline device according to claim 1, wherein the at least two conductive pipes comprise:

a first conductive pipe, the internal area of the first conductive pipe being configured to allow a refrigerant to flow; and at least one second conductive pipe, sleeved outside the first conductive pipe;

wherein the first insulating layers being arranged between the first conductive pipe and the second conductive pipe, and on an outer surface of the outermost layer of second conductive pipe, and the first conductive pipe and the at least one second conductive pipe being connected to the power supply.

3. The air conditioner pipeline device according to claim 1, wherein the multi-layer pipe further comprises:

a protective pipe, coaxially sleeved outside the at least two conductive pipes.

4. The air conditioner pipeline device according to claim 1, wherein a diameter of the gaseous refrigerant connecting pipe is greater than a diameter of the liquid refrigerant connecting pipe, and the gaseous refrigerant connecting pipe adopts the multi-layer pipe.

5. The air conditioner pipeline device according to claim 1, wherein a voltage class connected to the outer layer of conductive pipe is less than a voltage class connected to the inner layer of conductive pipe.

6. The air conditioner pipeline device according to claim 1, wherein the power supply is a low-voltage power supply.

7. The air conditioner pipeline device according to claim 6, wherein the voltage range of the low-voltage power supply is (0V, 50V].

8. The air conditioner pipeline device according to claim 1, wherein the power supply is a direct-current power supply; the direct-current power supply has a first electrode and a second electrode; and the at least two conductive pipes comprise:

a first conductive pipe, an internal area of the first conductive pipe being configured to allow a refrigerant to flow, and the first conductive pipe being connected to one of the first electrode and the second electrode; and a second conductive pipe, sleeved outside the first conductive pipe, the second conductive pipe being connected to the other one of the first electrode and the second electrode.

9. An air conditioner, comprising the air conditioner pipeline device according to claim 1.

* * * * *